US005665938A

United States Patent [19]

Boshear et al.

[11] Patent Number: 5,665,938

[45] Date of Patent: Sep. 9, 1997

[54] ELECTRONIC DISPLAY ENCLOSURE

[76] Inventors: Jerry A. Boshear, 1530 Crocker St., Simi Valley, Calif. 93065; Charles R. Smiley, 18351 Blackhawk St., Northridge, Calif. 91326

[21] Appl. No.: 278,161

[22] Filed: Jul. 21, 1994

[51] Int. Cl.[6] ........ H02G 3/08

[52] U.S. Cl. ........ 174/50; 40/549; 40/564; 40/572; 40/575

[58] Field of Search ........ 174/50, 50.5, 52.1; 40/549, 564, 572, 575, 578

[56] References Cited

U.S. PATENT DOCUMENTS

| | | | |
|---|---|---|---|
| 905,468 | 12/1908 | Shearer | 40/549 X |
| 962,724 | 6/1910 | Smith | 40/549 |
| 2,588,545 | 3/1952 | Lawrence | 40/564 X |
| 2,622,356 | 12/1952 | Valente | 40/575 X |
| 2,924,639 | 2/1960 | Zelt . | |
| 3,225,476 | 12/1965 | Bockmann | 40/549 X |
| 3,272,978 | 9/1966 | Jackson . | |
| 3,392,228 | 7/1968 | Zerwes . | |
| 4,905,390 | 3/1990 | Stilling | 40/549 |
| 5,020,254 | 6/1991 | Sheppard | 40/578 X |
| 5,363,276 | 11/1994 | Crockett | 174/52.1 X |

FOREIGN PATENT DOCUMENTS

| | | | |
|---|---|---|---|
| 277569 | 1/1988 | European Pat. Off. | 174/50.5 X |
| 560642 | 9/1993 | European Pat. Off. | 174/52.1 X |
| 2634617 | 1/1990 | France | 174/52.1 X |
| 2702314 | 9/1994 | France | 174/52.1 X |
| 3440899 | 4/1986 | Germany | 174/67 X |
| 248240 | 7/1987 | Germany | 174/52.1 X |

*Primary Examiner*—Hyung S. Sough
*Assistant Examiner*—Dean A. Reichard
*Attorney, Agent, or Firm*—Gene Scott

[57] ABSTRACT

An outdoor enclosure for housing electronic display equipment constructed of a plurality of extrusions welded to side plates and top and bottom plates which allows easy access to the electronics through a tethered bottom door. The enclosure can house one or more electronic display faces. The front and rear surfaces can be glass, polycarbonate or metal and are held in place by an elastic cord. The enclosure is sealed on the ends by the use of gasketing between the main housing body and the end panels. The design of the enclosure discourages birds from roosting on the front and rear edges. Internally the enclosure provides for the electronics to be mounted on an easily removable plate which incorporates a unique continuous hook. The electronic subassembly plate is held in place by a simple elastic hose retainer. Installation and removal of the electronics subassembly requires no tools.

2 Claims, 8 Drawing Sheets

ELECTRONIC DISPLAY ENCLOSURE

FIELD OF THE INVENTION

This invention relates generally to electrical display signs as are commonly used for advertising, score boards and other applications and more particularly to an electronically controlled display sign enclosure.

BACKGROUND OF THE INVENTION

Enclosures for the present intended use are well known in the art. They are generally intended for use in areas where the general public gathers outdoors such as train platforms, bus stations, airport ground transportation areas, stadiums, arenas and other places where information is communicated visually.

The internal electronics of displays of this type are delicate and can be easily damaged. A typical installation of such displays requires three separate types of highly skilled workers and is a three step process. The first step involves having the housing built on site by skilled sign contractors. Second, electricians must be called in to pull the wiring for power and data signals. Finally, trained technicians wire the delicate electronics. With this in mind it is clear that an improved display enclosure structure is needed for the many applications in which they are used. Such an enclosure would provide a means for easy installation and setup as well as improved ease of maintenance. The prior art does not teach such an apparatus.

SUMMARY OF THE INVENTION

The current invention overcomes the aforementioned problems because it provides a prefabricated housing that can be installed on site by the electrician that pulls the wires. The delicate electronics are mounted on a plate with handles so that they can then simply be hung inside the enclosure by the same electrician and plugged in. This eliminates the need for multiple installers. A bottom door of the enclosure is tethered to the main body of the enclosure so that one person can easily open or close the box and not have to climb up and down a ladder. The electronic sub-assembly has handles provided for lifting the assembly in and out of the enclosure. Once the electronic sub-assembly is in place it can be held in place by inserting a plastic tube or hose between the electronics mounting plate and the enclosure extrusion.

Other features and advantages of the present invention will become apparent from the following more detailed description, taken in conjunction with the accompanying drawings, which illustrate, by way of example, the principles of the invention.

BRIEF DESCRIPTION OF DRAWINGS

The accompanying detailed description should be interpreted in accordance with the drawings which are briefly described as.

DESCRIPTION OF THE PREFERRED EMBODIMENT

Figure 8:
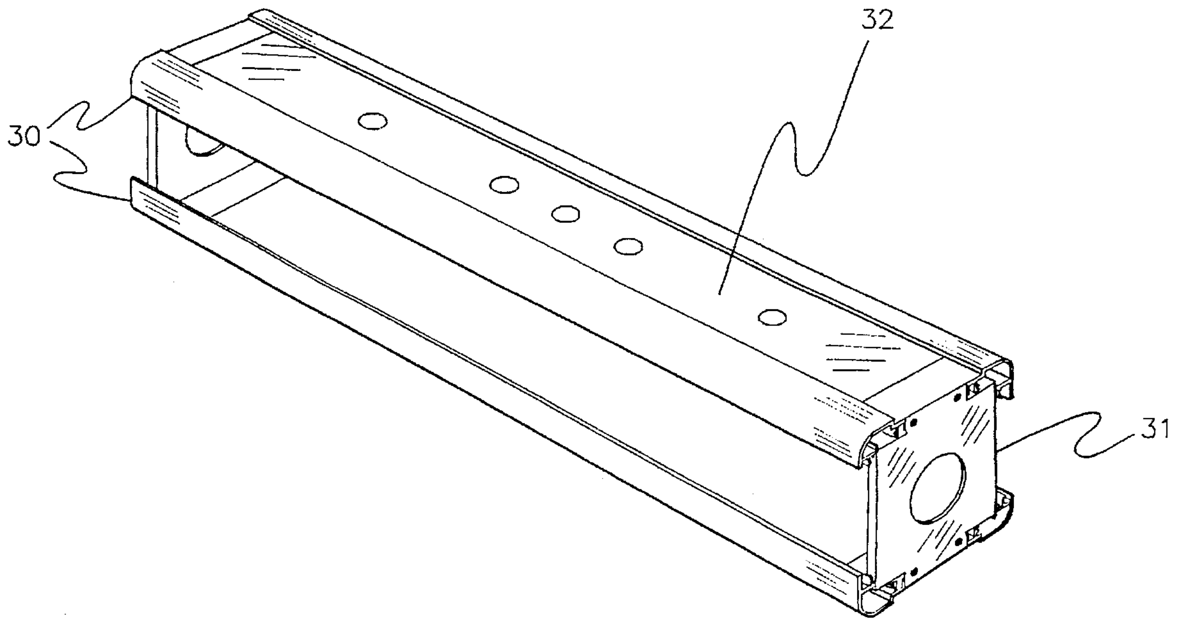
FIG. 8 is a view taken from FIG. 1 showing the body of the invention.

In the preferred embodiment a display enclosure is comprised of the enclosure main body 1 (FIGS. 1 and 1A), two polycarbonate filters with anti-glare finish 2, two neoprene gaskets 3 two end panels 4 and a bottom cover 6 with insulated tethers 5. The neoprene gaskets are sandwiched between the enclosure body 1 and the end panels 4. The end panels are attached to the enclosure body with stainless steel bolts 8. The elements of the main body of the enclosure which represent the typical construction for the embodiment of the invention are four extrusions 30 (FIG. 8), two end plates 31 and a top plate 32. The extrusions are used for the upper and lower corners and are welded to prefabricated end plates 31 that provide for structural rigidity. The ends plates are symmetrical in design so that a common part can be used for both ends just by flipping it over. A top plate 32 is then welded between the two top extrusions to create the top of the enclosure.

Figure 2:
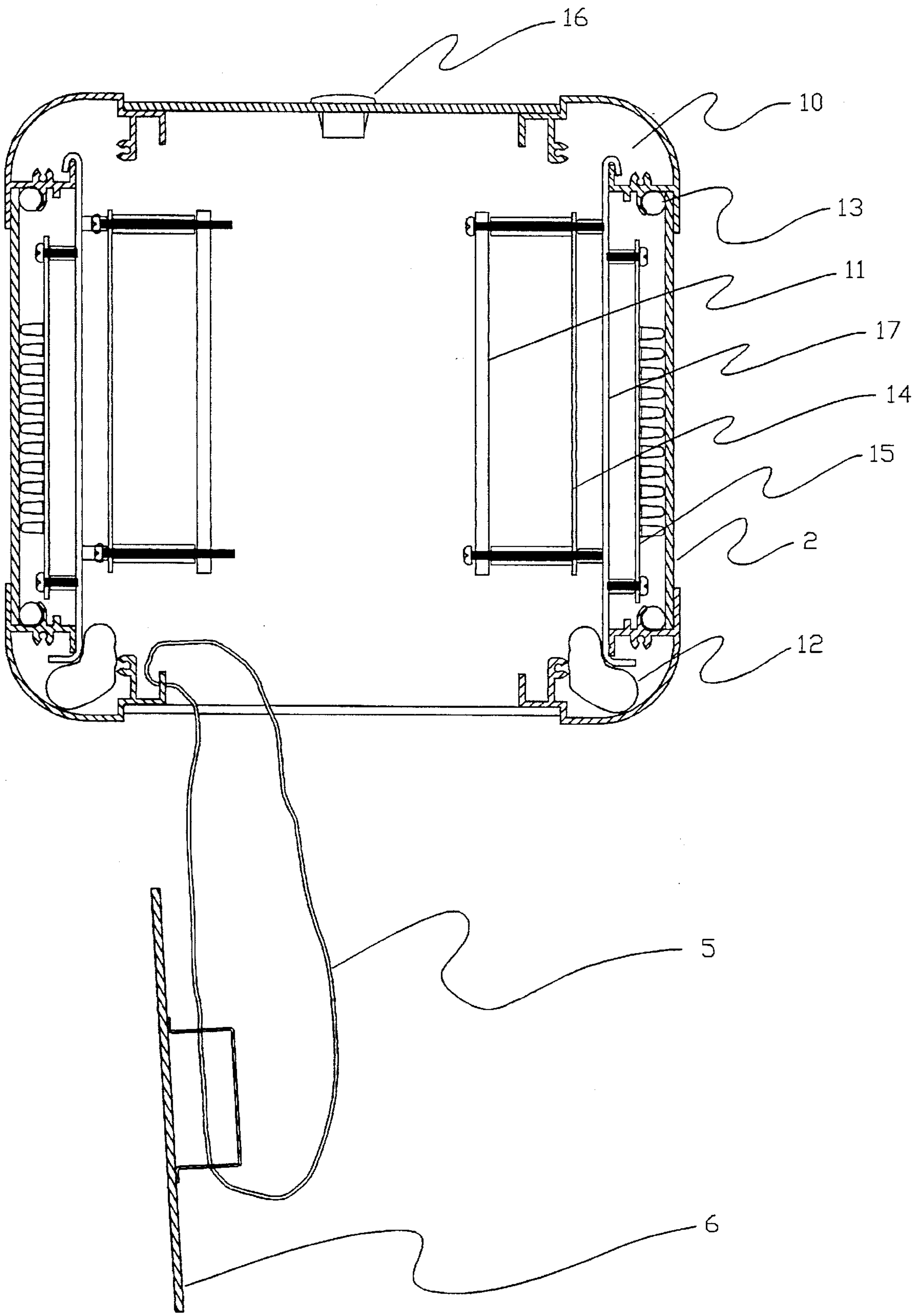
FIG. 2 is a cross-section of the enclosure of the preferred embodiment showing two electronic sub-assemblies installed.
Figure 3:
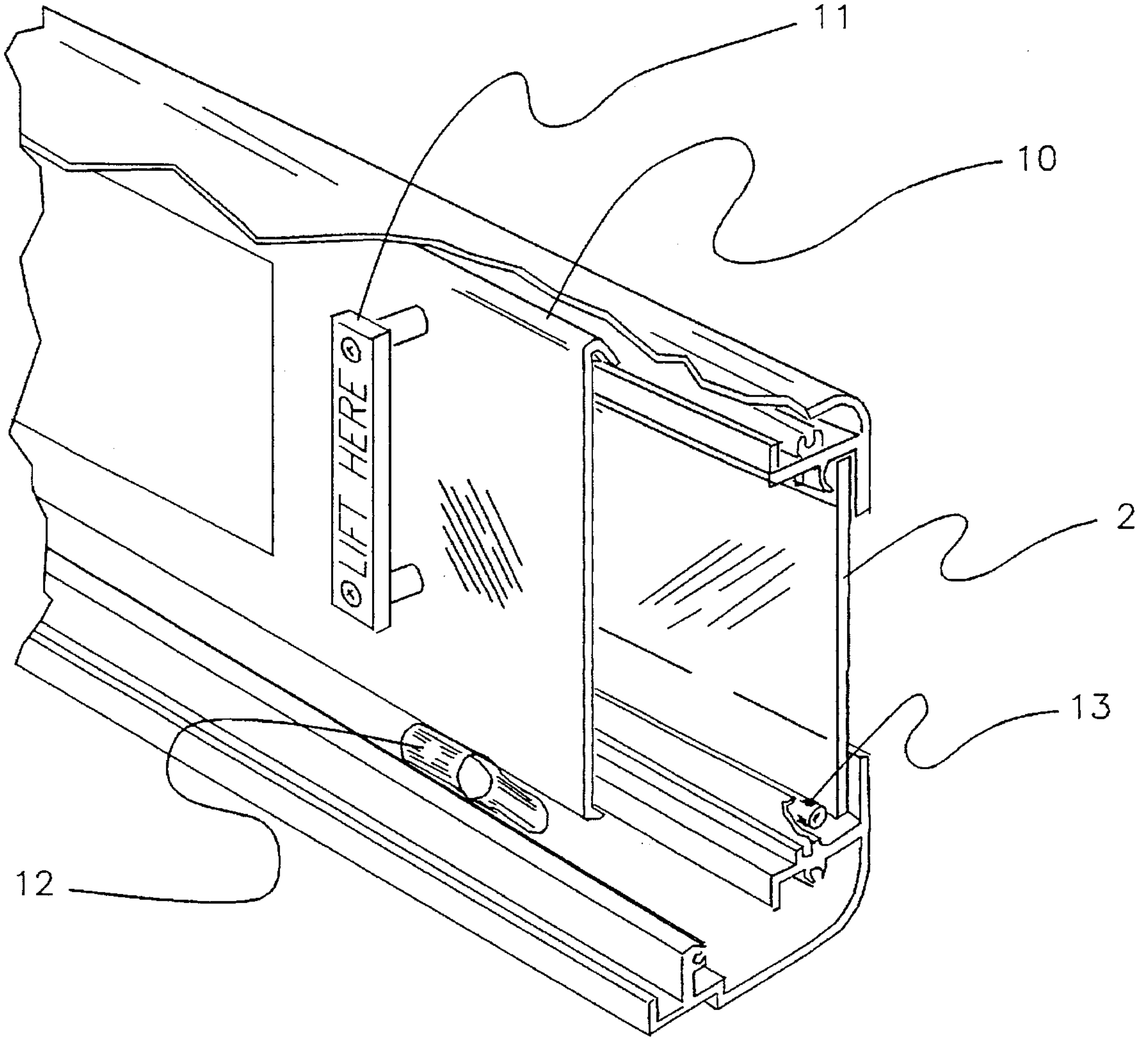
FIG. 3 is a cutaway view of one end of the enclosure of FIG. 1 showing the means for mounting the lens of the invention.

FIG. 2 shows a cross section of the assembled enclosure detailing how the bottom cover 6 is tethered to the enclosure body 1 and how the electronic sub-assemblies 10 are hung inside the enclosure and held in place by plastic hose 12. This view also shows how the polycarbonate lens 2 is held in place by neoprene cord 13. To install the electronic sub-assembly the installer lifts it with the two handles 11 up through the bottom of the enclosure and hangs it on the lip 41 (FIG. 4) of the extrusion as shown in FIG. 2 and then installs the plastic hose 12 to hold it in place. When removing the delicate electronics the installer simply removes the rubber hose 12 (FIG. 3) and lifts out the electronic sub-assembly 10 using handles 11 labeled "LIFT HERE".

Figure 1:
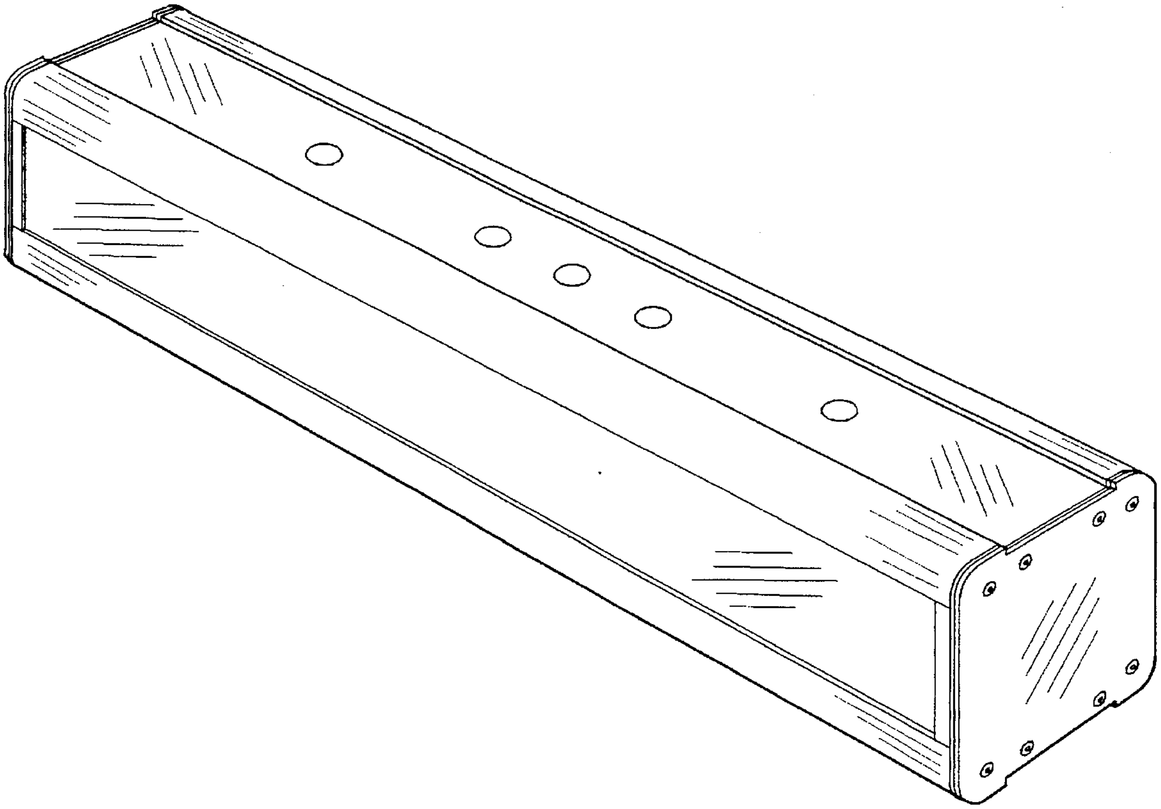
FIG. 1 is a perspective view of the present invention.
Figure 1A:
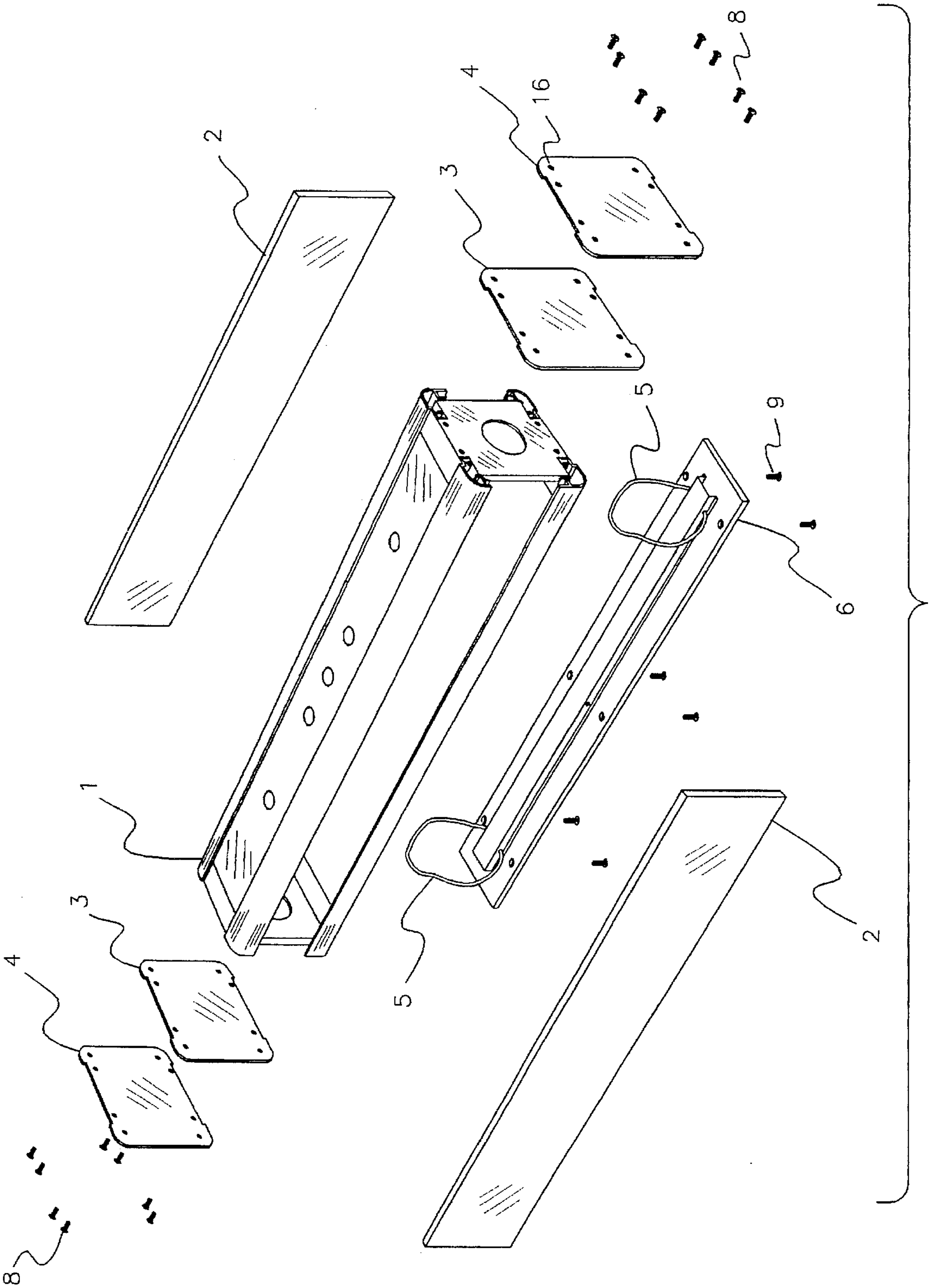
FIG. 1A is an exploded view of the invention of FIG. 1 without electronics.

A gasket 3 (FIG. 1) which is weather resistant is placed between the main body 1 and the end panels 4. The end panels are then secured to the main body with stainless steel bolts 8. The extrusion 30 (FIG. 7) used on the bottom of the enclosure has threaded inserts 71 to which the bottom plate 6 (FIG. 2) is attached with stainless steel bolts 9 (FIG. 1). The bottom plate is retained by weather resistant tether lines 5 (FIG. 1) by looping the lines through holes 74 (FIG. 7) in extrusion 30.

Figure 4:
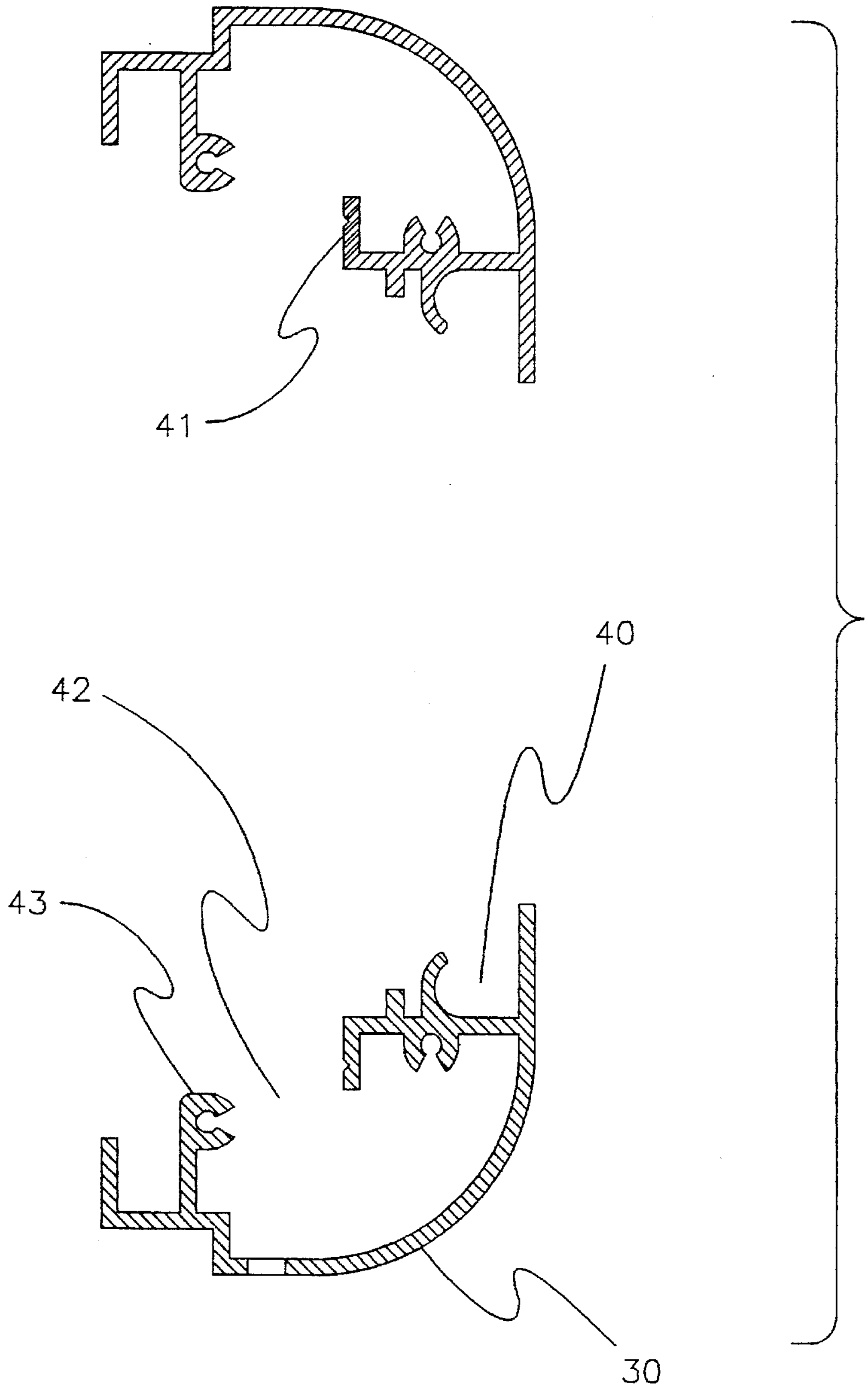
FIG. 4 is a cross-sectional view of the extrusions of the invention.
Figure 5:
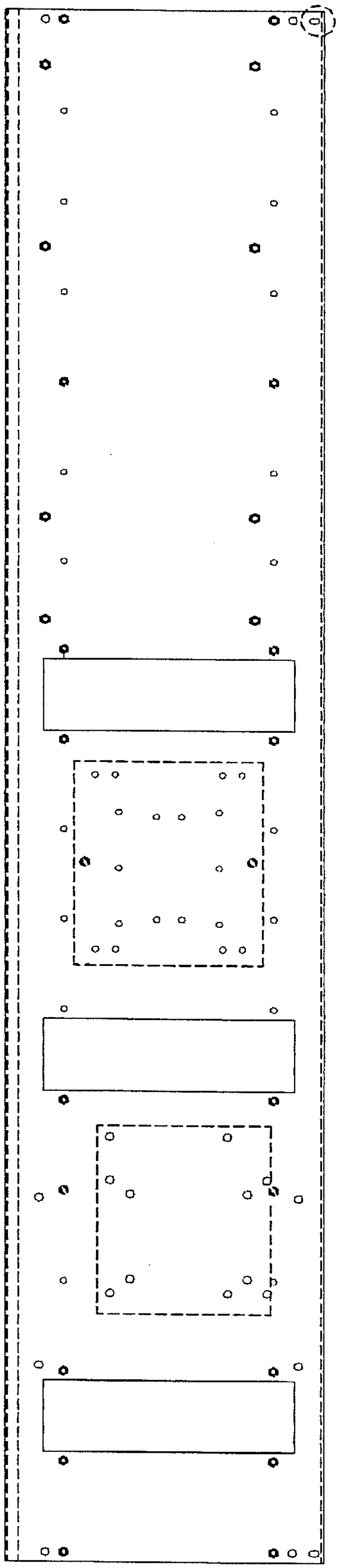
FIG. 5 is an elevational view of a typical electronics board of the invention showing mounting means.

FIG. 4 shows a cross-section of extrusion 30 (FIG. 8) which has slots and lips that provide for various functions integral to the enclosure. Namely, slot 40 provides a position for mounting either the lens 2 (FIG. 1) of either glass, polycarbonate, or some other light passing material. One lens can be replaced by a plate and the enclosure will have one viewing side (the front) and one non-viewing side (the rear) which can then be used to attach static signs such as advertising. Lip 41 is used to suspend a mounting plate 10 (FIG. 3) to which an electronic control module 14 is mounted and an electronic display module 15 as shown (FIG. 2). Another area 42 is formed between lip 41 and lip 43 and provides a groove for a shock absorbing material 12 (FIG. 2) which also retains the assembled plate 10.

Figure 7:
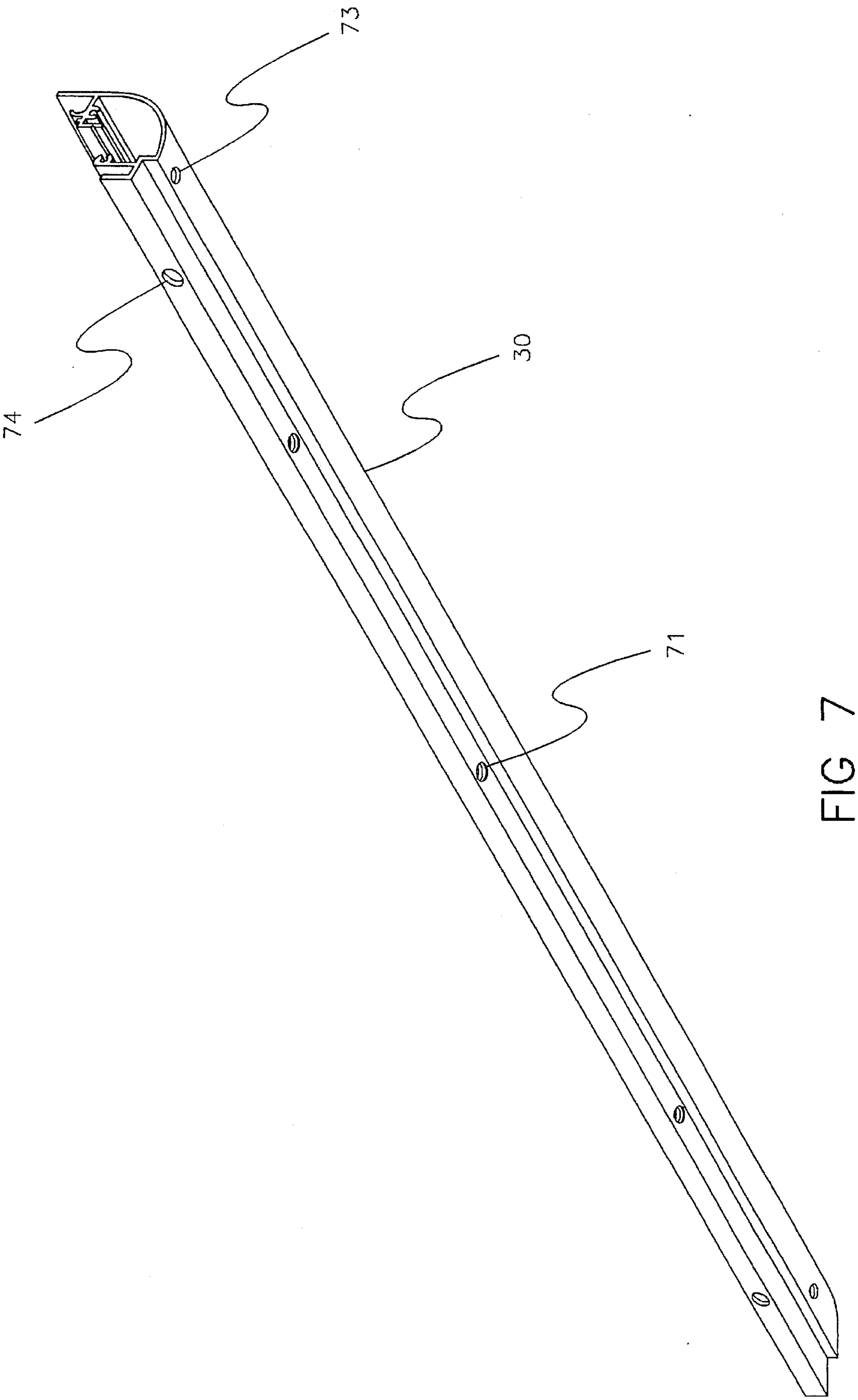
FIG. 7 is a perspective view of the extrusion of the invention showing the weep holes therein.

FIG. 7 shows the extrusion with threaded inserts 71 which are provided to secure the bottom plate 6 (FIG. 1) with stainless steel bolts 9 (FIG. 1). Holes 73 are provided to allow for drainage of any moisture that may be present. The extrusion has a lip 43 (Fig. 4) that acts as a splash guard to protect against water under high pressure (which might occur when someone hoses down the front of the display) from reaching the electronics that are mounted to the plate.

Figure 6:
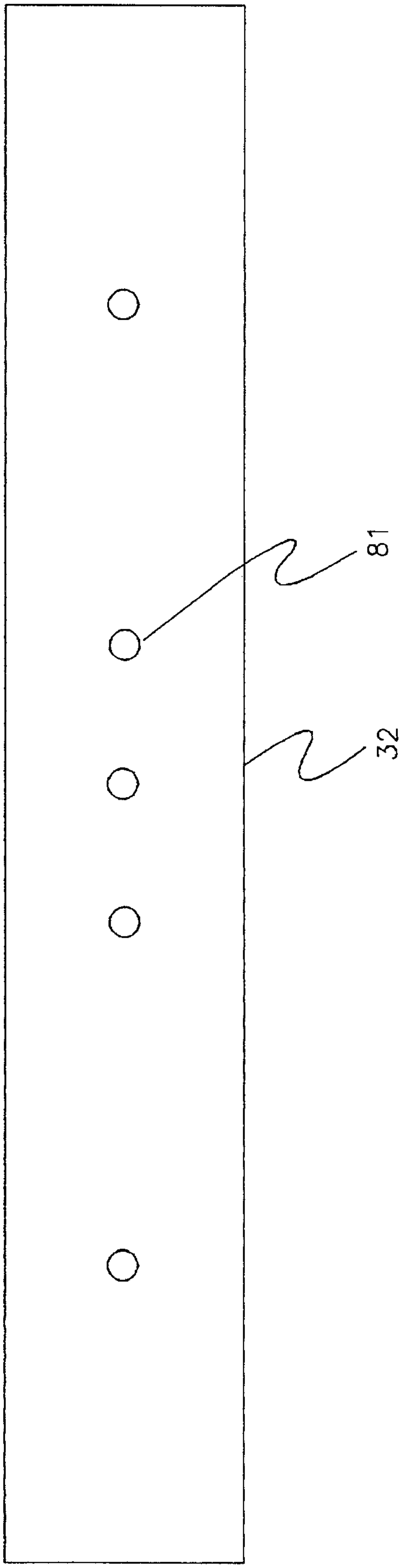
FIG. 6 is a plan view of the top plate of the invention.

The top plate 32 (FIG. 6) has a number of holes 81 (FIG. 6) provided as mounting positions. These holes are plugged with weather resistant caps 16 (FIG. 2) which can be removed for mounting. Additionally, these holes provide entrance for power and data cables via standard ¾" electrical conduit as well as positions for mounting external devices such as strobes or speakers.

The enclosure when fully assembled provides for easy removal of the electronic sub-assembly 10 (FIG. 3) through the bottom of the enclosure once the bottom cover plate 6 (FIG. 2) is removed. The opening created by the removal of the bottom cover is then large enough to reach inside and remove the electronic sub-assembly after removing the shock absorbing retainer 12 (FIG. 2) and lifting the sub-assembly off the lip 41 (FIG. 4). Prior to removal of the plate, data and power cables are disconnected. The bottom plate 6 (FIG. 1) is secured to the enclosure with tethered lines 5 (FIG. 1) so that it can not be lost and the service technician does not have to concern himself about where to put it. The end panels 4 have threaded inserts 16 that provide for mounting of the enclosure from its ends.

While the invention has been described with reference to a preferred embodiment, it is to be clearly understood by those skilled in the art that the invention is not limited thereto. Rather, the scope of the invention is to be interpreted only in conjunction with the appended claims.

What is claimed is:

1. A display enclosure comprising:

four linear, elongated extrusions oriented in parallel juxtaposition, and forming four comers of the enclosure, the four extrusions mutually interconnected at their ends by a pair of opposing end plates;

a top plate, a bottom plate and at least one filter lens, each secured between two of the extrusions for enclosing the enclosure;

at least one electronic sub-assembly mounted and positioned within the enclosure behind the at least one lens, for viewing the at least one sub-assembly therethrough, wherein the corners of the enclosure each provide a lip, the at least one electronic sub-assembly being hooked over at least one of said lips and frictionally engaged with an opposing at least one of said lips for rigidly mounting the at least one sub-assembly therebetween.

2. The enclosure of claim 1 further including at least one elongate resilient shock absorbing retainer of a size and shape for being compressed between the at least one sub-assembly and at least one of the comers for functionally locking the at least one sub-assembly on the lips.

* * * * *